United States Patent
Naouss (10) Patent No.: US 12,254,349 B1
(45) Date of Patent: Mar. 18, 2025

(54) ON-CHIP COMMUNICATION ARCHITECTURE FOR A HETEROGENOUS SYSTEM

(71) Applicant: UNITED ARAB EMIRATES UNIVERSITY, Al-Ain (AE)

(72) Inventor: Mohammad Naouss, Al-Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/441,697

(22) Filed: Feb. 14, 2024

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ...................................... G06F 9/4881
USPC ........................................... 718/102
See application file for complete search history.

(56) References Cited

U.S. PATENT DOCUMENTS

| | | | |
|---|---|---|---|
| 9,465,658 B1 * | 10/2016 | Shashi | G06F 9/5027 |
| 9,703,573 B1 * | 7/2017 | Giefers | G06F 9/4484 |
| 2009/0031319 A1 * | 1/2009 | Fecioru | G06F 9/4881 |
| | | | 718/103 |
| 2013/0231969 A1 * | 9/2013 | Van Pelt | G06Q 10/06311 |
| | | | 705/7.13 |
| 2014/0181319 A1 * | 6/2014 | Chen | G06F 13/385 |
| | | | 709/234 |
| 2017/0142227 A1 * | 5/2017 | Huang | H04L 67/1029 |
| 2018/0089119 A1 * | 3/2018 | Khan | G06F 9/5077 |
| 2018/0129503 A1 * | 5/2018 | Narayan | H03K 19/0175 |
| 2018/0246765 A1 * | 8/2018 | Chen | G06F 9/4881 |
| 2020/0326992 A1 * | 10/2020 | Jin | G06F 9/5083 |
| 2020/0371828 A1 * | 11/2020 | Chiou | G06F 11/0793 |
| 2021/0011823 A1 * | 1/2021 | Guim Bernat | G06F 11/263 |
| 2021/0097221 A1 * | 4/2021 | Liao | G06F 9/544 |
| 2022/0374277 A1 * | 11/2022 | Kim | G06F 9/5055 |
| 2023/0012710 A1 * | 1/2023 | Amarnath | G06F 9/44505 |
| 2023/0401092 A1 * | 12/2023 | Ogras | G06F 9/4881 |

* cited by examiner

*Primary Examiner* — Mehran Kamran
(74) *Attorney, Agent, or Firm* — MH2 Technology Law Group, LLP (57) ABSTRACT

The present disclosure discloses an on-chip communication architecture for facilitating the distribution of tasks within a heterogenous system, the architecture comprising a hardware component comprising a hardware manager, a communication interface, a reconfigurable region, a plurality of hardware modules, and a software component comprising a software manager and a plurality of software modules, wherein the hardware manager is configured to receive a control signal from the software manager, such that the tasks are allocated to either the hardware component or the software component at least as a function of the control signal. The present disclosure also discloses a method of facilitating the distribution of tasks within a heterogeneous system using an on-chip communication architecture.

18 Claims, 8 Drawing Sheets

ON-CHIP COMMUNICATION ARCHITECTURE FOR A HETEROGENOUS SYSTEM

FIELD

The present disclosure concerns an on-chip communication architecture. More particularly, but not exclusively, the present disclosure concerns an on-chip communication architecture for facilitating the distribution of tasks within a heterogenous system.

BACKGROUND

Background description includes information that will be useful in understanding the present invention. It is not an admission that any of the information herein is prior art or relevant to the presently claimed invention, or that any publication specifically or implicitly referenced is prior art.

The rapid evolution of industrial applications poses a unique challenge requiring high computing performance, flexibility, energy efficiency and real-time processing to meet the demands of product users and the market.

For example, users performing tasks on embedded image processing or video (de) compression applications require the use of increasingly complex algorithms. Due to this increase in complexity, these applications always require more computing power and flexibility.

Current processors are very efficient at the level of data management and control but are less efficient at the level of calculation and data processing due to their sequential architecture.

On the other hand, hardware solutions like Field Programmable Gate Arrays (FPGA) have parallel fine-grain architectures that enable them to achieve high computing power with low energy consumption.

However, an FPGA architecture on its own is inflexible and suffers from poor performance in data management and control.

As a result, the combined use of hardware and software architectures—which form a heterogenous system—is aimed at providing better integration density and flexibility to computing systems.

However, achieving a high-performing heterogenous system requires an optimal distribution of tasks which take advantage of the computing power of the hardware accelerator as well as the flexibility and management speed of the processor.

Current manufacturers of heterogenous systems (based on a FPGA) provide tools to distribute modules of an application between the CPU and FPGA platforms of the system.

Although these tools are powerful and portable, their static nature limits the flexibility of the system.

In turn, current hardware heterogenous systems are not able to migrate processes in the two heterogenous worlds (hardware and software) without considering the application and cannot guarantee continuity of service. In order to redistribute processes or tasks between the components of the heterogeneous system, the system must be shut down, disrupting the service.

The present disclosure seeks to mitigate the above-mentioned problems. Alternatively, or additionally, the present disclosure seeks to provide an on-chip communication architecture for the distribution of tasks within a heterogenous system.

SUMMARY

The present disclosure provides, according to a first aspect, an on-chip communication architecture for the distribution of tasks within a heterogenous system, the on-chip communication architecture comprising a hardware component comprising a hardware manager, a communication interface, a reconfigurable region, and a plurality of hardware modules; and a software component comprising a software manager and a plurality of software modules. The hardware manager is configured to receive a control signal transmitted by the software manager. The control signal comprises data that determines whether a task is to be allocated to the hardware component or the software component.

By having a hardware manager in communication with a software manager and a reconfigurable region, the architecture provides a standard inter-task communication interface that is compatible with software modules (on CPU, for example) and electronic hardware modules (on FPGA, for example), without impacting the quality of the system (such as resource used, dynamic distribution of the tasks, for example).

The use of the control signal to allocate tasks enables tasks that are "hybrid" (i.e., able to be performed by either hardware modules or software modules) to be allocated to either hardware modules or software modules depending on other parameters to optimise the task distribution and efficiency of the heterogeneous system.

The software manager may be configured to receive a user-defined parameter from a user and output a software manager control signal. This software manager control signal may be a function of the user-defined parameter.

The user-defined parameter may comprise an upper bound on resource utilisation. The upper bound on resource utilisation may be an upper bound on the resource utilisation of hardware modules. The upper bound may be 90% of utilisation of hardware modules. The upper bound may be 85% of utilisation of hardware modules. The upper bound may be 80% of utilisation of hardware modules. The upper bound may be 75% of utilisation of hardware modules.

The upper bound may be implemented to conform to engineering standards, or protocols, for example.

The user-defined parameter may comprise an upper bound on resource utilisation of software modules. The upper bound may be 90% of utilisation of software modules. The upper bound may be 85% of utilisation of software modules. The upper bound may be 80% of utilisation of software modules. The upper bound may be 75% of utilisation of software modules.

The software manager may interpret the user-defined parameter and convert the parameter into a control signal to be interpreted by the hardware manager, such that the tasks are distributed in accordance with the user-defined parameter.

The control signal may be the software manager control signal.

In embodiments, the software manager control signal is not influenced by other inputs, and therefore the control signal received by the hardware manager is the software manager control signal.

In embodiments, other inputs or control signals are combined with the software manager control signal, and therefore, the control signal received by the hardware manager is a function of the software manager control signal and other inputs or control signals.

The software manager may receive the user-defined parameter from the user in soft-real time. The term soft-real time may refer to the timely reallocation of tasks which allow for occasional missed deadlines without affecting the critical tasks or modules executing on the system.

The architecture may allow online user-defined parameters which enable dynamic adjustments to system behaviour, allowing user to optimise performance based on changing requirements on environmental conditions, advantageously, without shutting down or disrupting system operations.

The user-defined parameter may comprise an upper band on resource utilisation of hardware modules within the hardware component or software modules within the software component.

The architecture may comprise a first interconnect connecting the software component with the hardware component. The first interconnect may receive a software manager control signal from the software manager and output the control signal. The control signal may be a function of the software manager control signal. The control signal may be the software manager control signal.

The software component may comprise a software module. The software module may output data to the first interconnect. The data may comprise a control signal. The data may comprise information on the load of the software module. The control signal may be a function of the software manager control signal and the data from the software module.

The software component may comprise a plurality of software modules. The plurality of software modules may output data to the first interconnect.

The architecture may comprise a second interconnect connecting the software component with the hardware component enabling data to inter-flow between the communication interface and the software component. The second interconnect may comprise a signal adapter. The second interconnect may comprise a crossbar. The second interconnect may comprise a buffer. The second interconnect may comprise an advanced extensible interface (AXI) bus.

The second interconnect enables communication between the hardware component and the software component.

The reconfigurable region may comprise the plurality of hardware modules and each hardware module may be configured to perform at least one of the tasks. The term hardware modules may refer to reconfigurable modules, and vice versa.

The reconfigurable region may comprise memory components connected to the plurality of hardware modules.

The memory components may comprise a shared memory system comprising a Block Random Access Memory (BRAM).

The communication interface may comprise a plurality of transmission components and may comprise a plurality of receiving components.

According to a second aspect of the present disclosure, there is provided a method of facilitating the distribution of tasks within a heterogenous system using an on-chip communication architecture. The architecture comprises a hardware component comprising a hardware manager, and a software component comprising a software manager. The method comprises the steps of: outputting a software manager control signal from the software manager; receiving a control signal to the hardware manager, the control signal being at least a function of the software manager control signal; allocating tasks to either the hardware component or the software component at least as a function of the control signal.

The method of facilitating the distribution of tasks within a heterogenous system may comprise receiving a user-defined parameter by the software manager, and the step of outputting may comprise outputting a software manager control signal, wherein the outputting step may be a function of the user-defined parameter.

The hardware component may comprise hardware modules and the software component may comprise software modules. The user-defined parameter may comprise software modules, and the user-defined parameter may comprise an upper bound on resource utilisation of the hardware modules within the hardware component or software modules within the software component.

The method of facilitating the distribution of tasks within a heterogenous system may comprise the step of receiving the software control signal at a first interconnect. The method of facilitating the distribution of tasks within a heterogenous system may comprise the step of outputting the control signal from the first interconnect.

The method of facilitating the distribution of tasks within a heterogenous system may comprise the first interconnect receiving a request from a software module, wherein the control signal may be a function of the software manager control signal and the request.

The hardware component may comprise a reconfigurable region. The method of facilitating the distribution of tasks within a heterogenous system may comprise performing calculations by hardware modules within the reconfigurable region to determine the distribution of tasks.

The tasks may be hybrid tasks.

The architecture may comprise a communication interface. The method of facilitating the distribution of tasks within a heterogenous system may comprise distributing the tasks to the software manager via a second interconnect, wherein the distributing may be performed by the communication interface.

It will be understood that features disclosed in relation to one aspect of the present disclosure may be applicable to another aspect of the present disclosure and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments. It will be appreciated in the forgoing description that like reference numerals denote like elements.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of on-chip communication architecture, and more particularly to on-chip communication architecture for facilitating the distribution of tasks within a heterogenous system.

The principles of the present invention and their advantages are best understood by referring to FIG. 1 to FIG. 7. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1A:
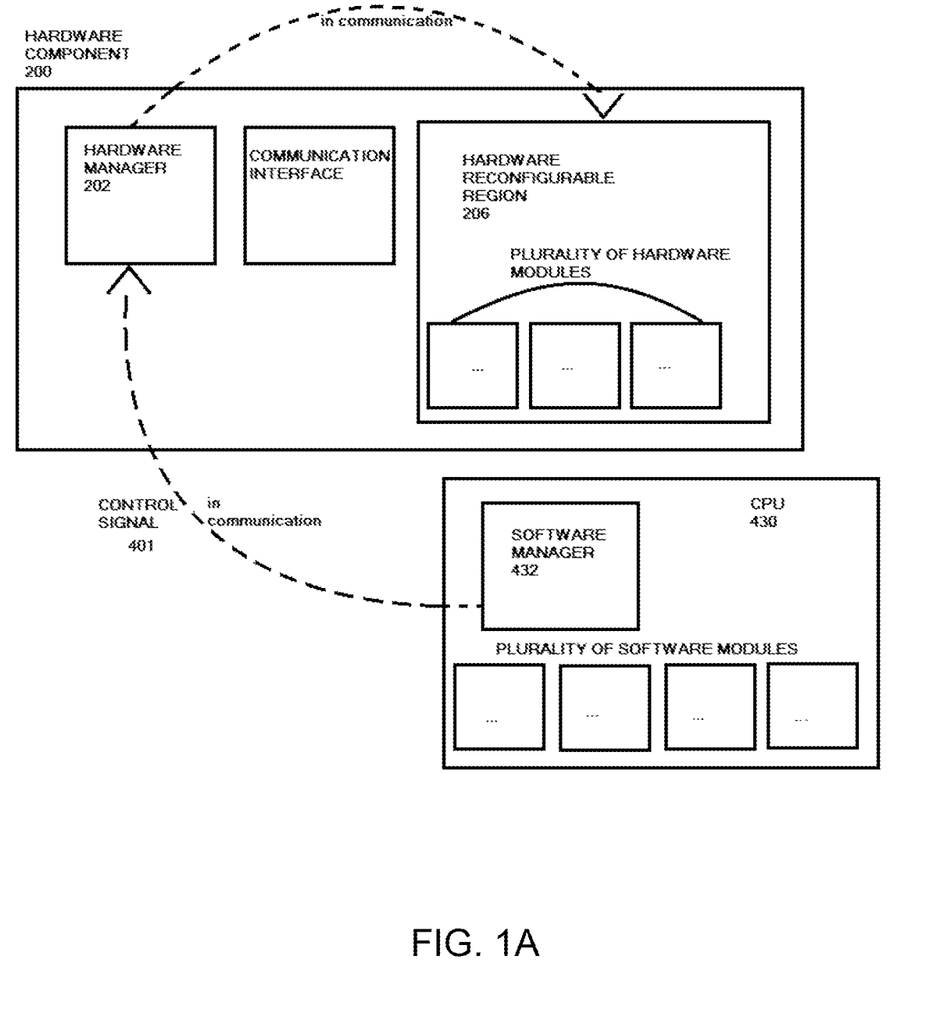
FIG. 1A is a block diagram showing the basic structure and functionality of an example of the proposed architecture in accordance with the present disclosure.
Figure 1B:
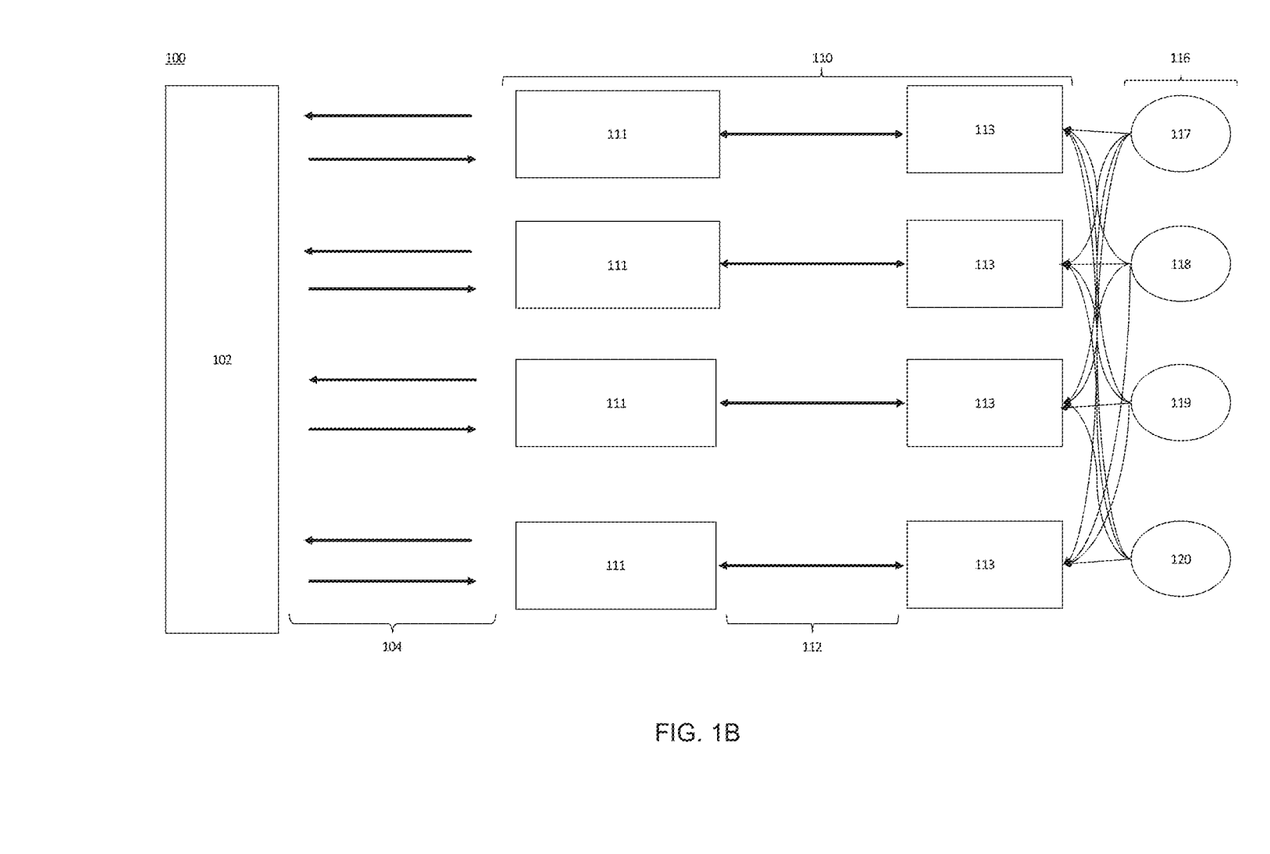
FIG. 1B shows a reconfigurable interface structure according to an embodiment of the present disclosure.

FIG. 1A is a block diagram showing the basic structure and functionality of an example of the proposed architecture in accordance with the present disclosure. FIG. 1B shows a reconfigurable interface structure according to an embodiment of the present disclosure.

The structure 100 is of part of the hardware part of the overall architecture. The structure 100 comprises a first static part 102, a dynamic region 110, and a second static part 116. The first static part 102 is a hardware manager 102.

The hardware manager 102 exchanges data 104 with the dynamic region 110. The data 104 includes task information, data, and a header. The header is metadata of the data. The header includes information on the identification of the data, the destination of the data communicated, the size of the data, and the identifier of the transmitter module. The header information is located in a user-defined hardware library. This library contains all the information concerning the system (number of software and hardware modules, the data size of each module and the communicating modules in matrix format).

The dynamic region 110 comprises an adapter 111. The dynamic region 110 may also be termed the reconfigurable region 110. Each reconfigurable region 110 has its own adapter 111. The role of this adapter 111 is to adapt the input/output signals and the data size between two different blocks at input and output. The communication architecture requires a specific data format at the output of the adapter. A header is added to the data at the output of the adapter. The size of the header is set by the user.

The dynamic region 110 comprises a partially reconfigurable region 113. The partially reconfigurable region 113 contains the application module and is a consistent part of an application whose interface with the rest of the application is reduced. The partially reconfigurable region exchanges data 112 at input and output with adapter 111.

The second static part 116 and comprises modules 117 to 120. The modules 117 to 120 can be implemented in hardware as well as software. The modules 117 to 120 transmit data 114 to the partially reconfigurable region 113.

Figure 2:
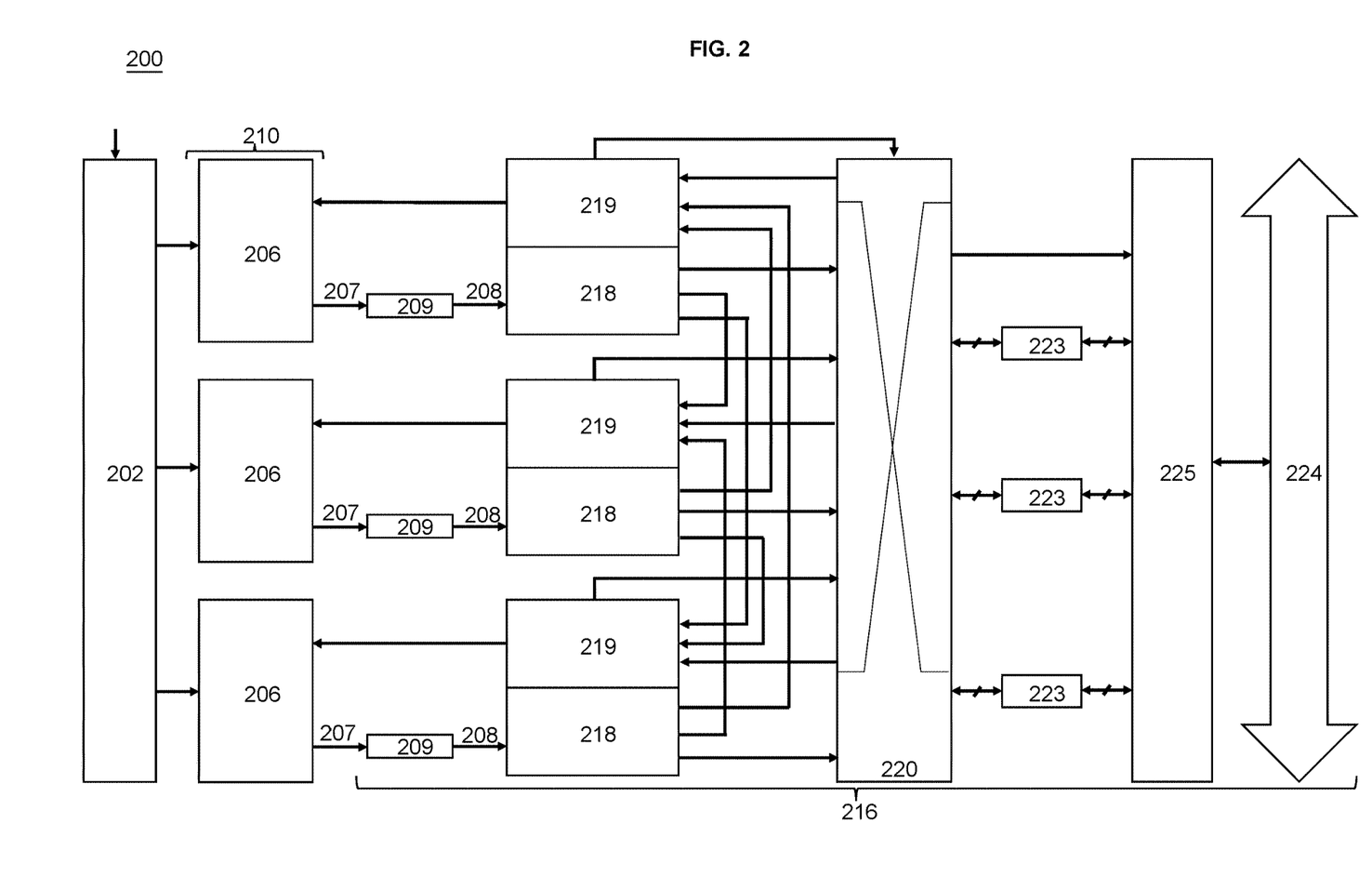
FIG. 2 shows the architecture of the hardware component according to an embodiment of the present disclosure.

FIG. 2 shows the architecture of the hardware component according to an embodiment of the present disclosure.

The structure 200 is part of the hardware part of the overall architecture. The structure 200 comprises a first static part 202, a dynamic region 210, and a second static part 216. The first static part 202 is a hardware manager 202. The dynamic region 210 comprises a plurality of hardware reconfigurable regions 206. A hardware reconfigurable region 206 comprises a plurality of hardware modules. The second static part 216 comprises a plurality of hardware sub-components.

The hardware reconfigurable region 206 comprises a hardware adapter that is configured with a configured hardware library containing all the information to communicate the modules with each other. When a hardware module changes in a hardware reconfigurable region 206, the hardware adapter calls the library to identify who the loaded hardware module will communicate with.

The second static part 216 communicates the hardware modules between them and ensures the exchange of data between the software part and the hardware part. In case of a request sent by software modules, the hardware manager 202 can send this information to the dedicated hardware interfaces.

The second static part 216 comprises a memory component unit 209 at the end of each reconfigurable region 206. The role of the memory component 209 is to act as a first-in first-out mailbox that receives data-in 207 from the hardware reconfigurable region 206 and outputs the data-out 208. The number of memory components 209 is configured by the user and depends on the number of reconfigurable regions 206 and the size of the data.

The second static part 216 comprises a first communication interface 218 (for transmission) and a second communication interface 219 (for reception). Depending on the information communicated by the processor to the hardware part, the communication interfaces 218 and 219 can manage the communication either between the hardware modules themselves, or between the software part and the hardware modules and vice versa.

The second static part 216 also comprises a crossbar 220, buffers 223, a wrapper 225, and an AXI bus 224.

Figure 3:
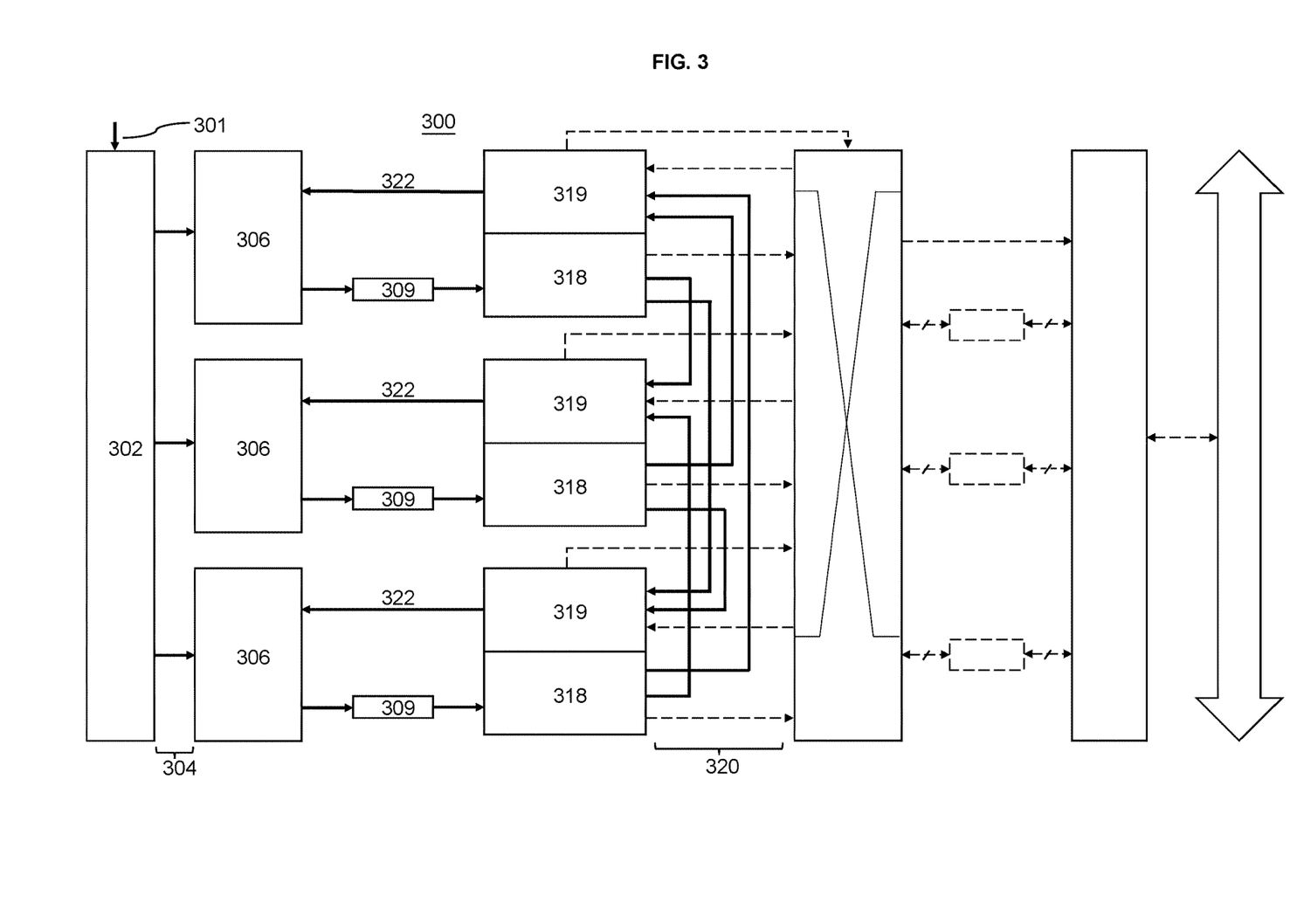
FIG. 3 shows the communication between two hardware modules according to an embodiment of the present disclosure.

FIG. 3 shows the communication between two hardware modules according to an embodiment of the present disclosure.

The structure 300 is part of the hardware part of the overall architecture.

The parameters of the first direction of communication from one hardware reconfigurable region 306 to another comprise the CPU loading the hardware module located in the appropriate software module and sending a control signal 301 containing the identifier information for each target hardware reconfigurable region 306.

The hardware manager 302 routes the communication information 304 for the appropriate reconfigurable region 306 and the hardware adapter configures the data header.

The first communication interface 318 routes the data 320 according to the information located in the header. The second communication interface 319 then routes the data 322 to the dedicated module according to the information located in the input.

The hardware receiver module, located in the reconfigurable region 306, receives the data, performs calculations, and saves its output in the memory component 309 dedicated to it. At the end of the data transmission, the interconnection between the two reconfigurable regions 306 will be unlocked.

Figure 4:
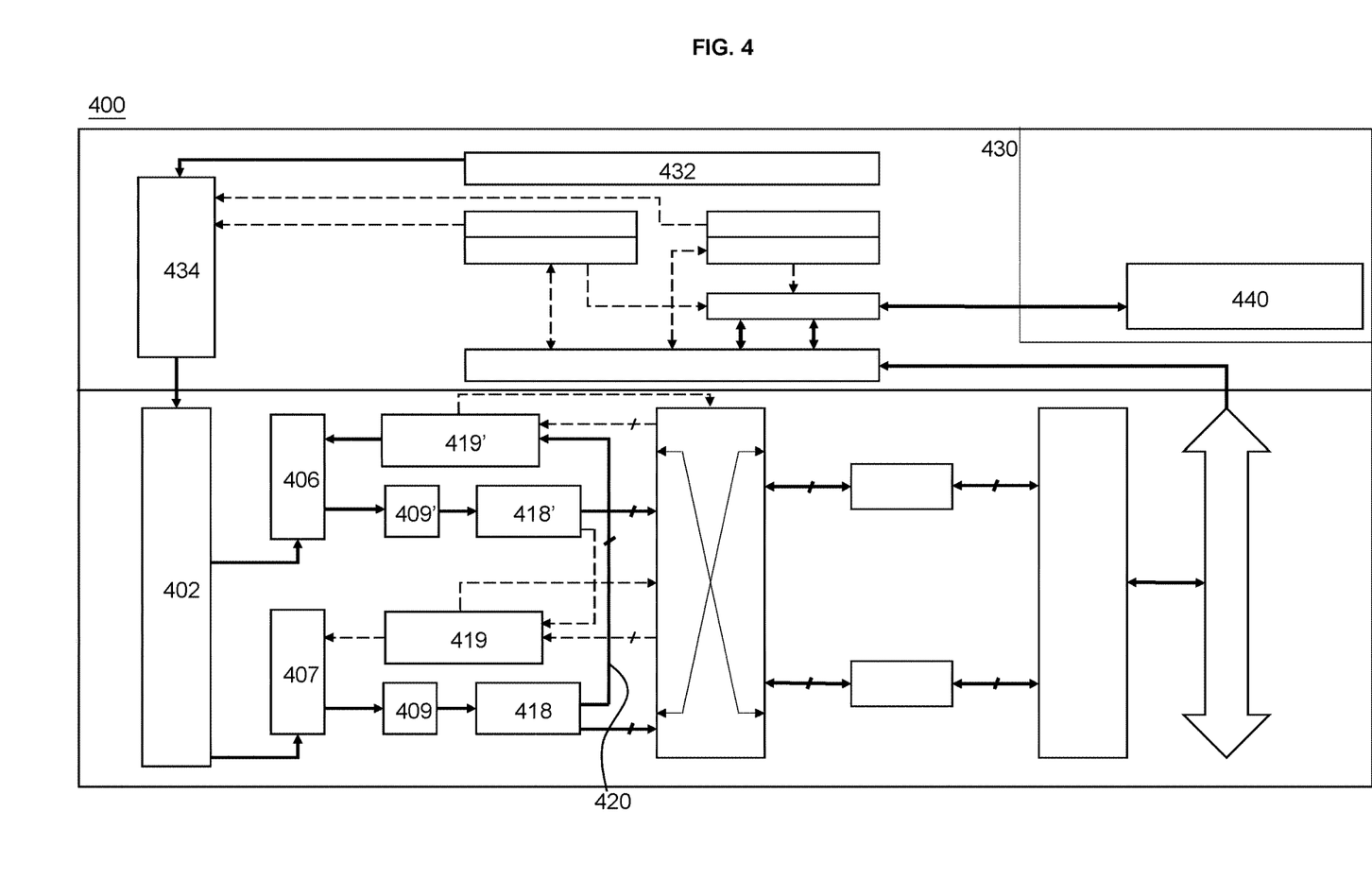
FIG. 4 shows the communication between two hardware modules according to an embodiment of the present disclosure.

FIG. 4 shows the communication between two hardware modules according to the embodiment of the present disclosure.

The structure 400 is part of the hardware part and software part of the overall architecture. The structure 400 comprises a CPU 430. The software part comprises a CPU 430 comprises a software manager 432 and a central interconnect 434. The central interconnect acts as a communication bridge between the software part and the hardware part.

To configure the communication interface 418 and 419, the identifier information sent by the CPU 430 is necessary to authorize the instantiation of several hardware modules in the same hardware reconfigurable region 406 and to allocate a hardware module to multiple hardware reconfigurable regions 406. The identification information ensures the data follows the correct interconnection path to its destination.

If during the communication between a first hardware module 406 and a second hardware module 407, the transmitter module has been replaced by another hardware module, the communication interfaces 418 and 419 must adapt to the changes made without having a loss of data. This comprises a method of the CPU 430 sending a control signal 401 via the central interconnect 434 containing new communications parameters to the hardware manager 402. The hardware manager 402 routes the information for the appropriate reconfigurable region and the hardware adapter configures the first hardware module's 406 data header. The second hardware module checks if the memory component's 409 memory is empty before starting the calculation. If the memory component's 409 memory is empty, the second hardware module 407 begins performing calculations and the communication interface 418 routes the data 420 to the correct destination according to the information located in the data header.

In embodiments of the present disclosure, and in embodiments as disclosed herein, if during the communication the receiver module has been replaced by another module, the interface connected with the transmitter module must detect these modifications. The communication between the two modules will be interrupted. The receiving communication interface module must copy the data from the modified module to the DDR memory.

Figure 5:
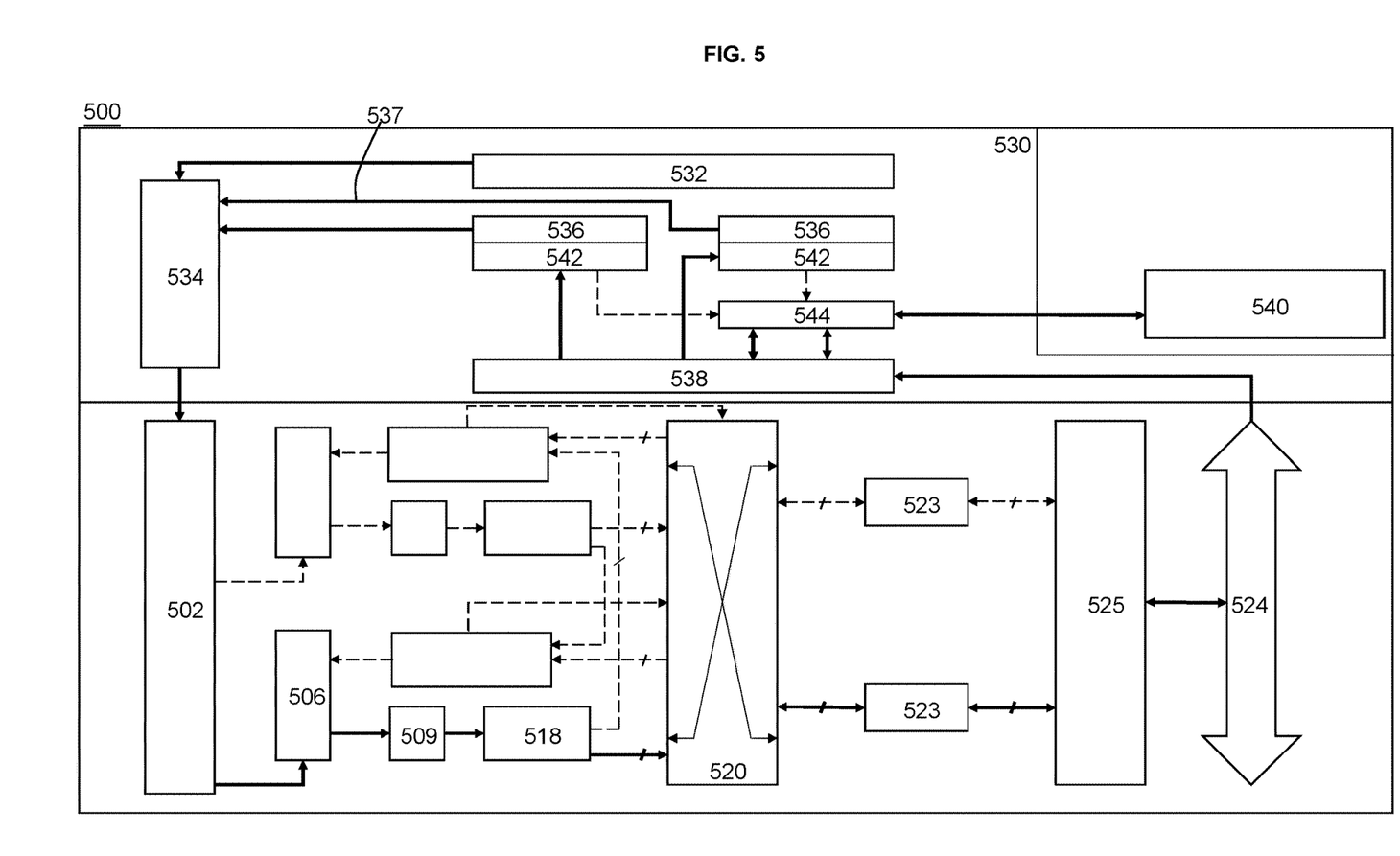
FIG. 5 shows the communication between a hardware module and a software module according to an embodiment of the present disclosure.

FIG. 5 shows the communication between a hardware module and a software module according to an embodiment of the present disclosure.

The structure 500 is part of the hardware part and the software part of the overall architecture. The structure 500 comprises a method of exchanging data between the hardware part and the software part based on the CPU 530 based on the FPGA. The software part comprises a CPU and comprises a software manager 532, a central interconnect 534, software modules 536 with cache memory 542, a PL to memory interconnect (PLM) 538, and memory interfaces 544.

The software module 536 send a request to the hardware manager 502 via the central interconnect 534 containing the identifier of the requestor.

The hardware manager 502 communicates this request 538 to the hardware adapter to configure the data header.

The hardware module checks if the memory component 509 associated with the hardware module 506 is empty or not. If the memory is empty, the communication interface 518 selects the output port (connected with the crossbar 520) in order to transport the data to the PLM module 538 via the AXI bus 524. The data travels from the crossbar 520, through buffers 523, through a wrapper 525 to arrive at the AXI bus 524.

The PLM module 538 checks whether the cache memory 542 of the software module 536 concerned is empty. If the cache memory 542 is empty, the PLM 538 will transmit the data directly to the software module 536. If the cache memory 542 is full, the processor can apply one of the cache replacement techniques (first-in first-out (FIFO), last-in first-out (LIFO), random) to replace the new data in place of the old data. Otherwise, the memory interfaces 544 must copy the data to the external DDR memory 540.

In embodiments of the present disclosure, if during the communication between the software part and the hardware part, the hardware reconfigurable region containing the hardware module has been changed, the communication interface must react to prevent the data from being mixed up. The method comprises the processor loading the new hardware module into its region. The hardware adapter configures the data header and the adaptation of the communication interface with the new parameters occurs. If the memory component is empty, the newly loaded hardware module begins performing its calculations. If the memory component is full, the new module will either wait for the memory component to be empty before performing its calculations or the hardware interface will manage copying the data in the memory component to the external DDR memory.

In embodiments of the present disclosure as disclosed herein, if the current software module has been moved to a hardware reconfigurable region, a method comprises the processor loading the new hardware module into its region and the new hardware module checking that the memory component is empty before performing its calculations. Where the memory component is full, the communication interface must dump the existing data into the external DDR memory.

Figure 6:
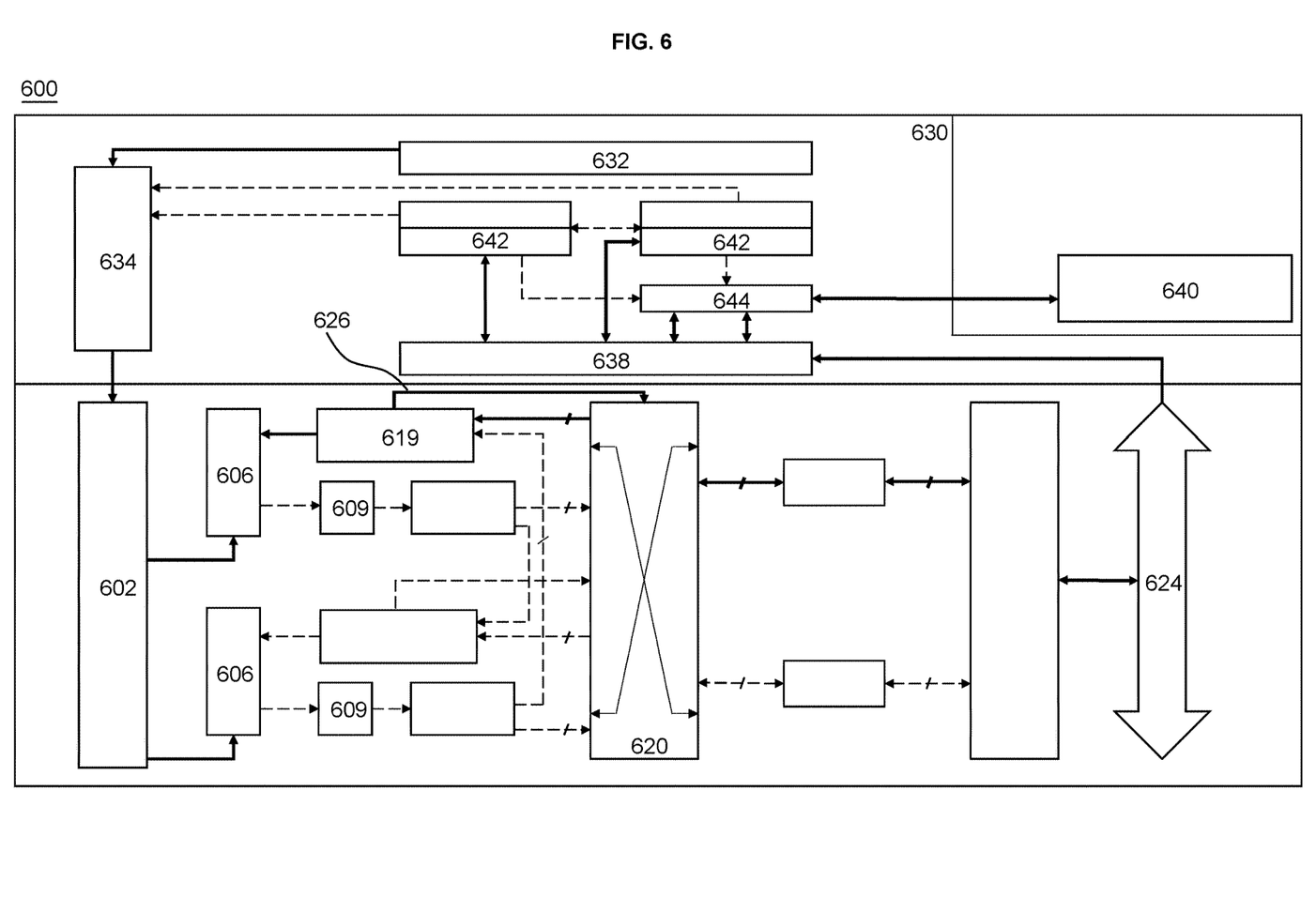
FIG. 6 shows the communication between a software module and a hardware module according to an embodiment of the present disclosure.

FIG. 6 shows the communication between a software module and a hardware module according to an embodiment of the present disclosure.

The structure 600 is part of the hardware part and the software part of the overall architecture. The structure 600 comprises a method of exchanging data between a software module and a hardware module.

The CPU 630 loads the hardware module in its region and the software manager 632 sends the communication information to the hardware manager 602 via the central interconnect 634.

The hardware manager 602 communicates this information to the hardware adapter to configure the header.

The receiving communication interface 619 configures the direction of the data (crossbar 620 side) and simultaneously sends the software part a request 626 containing the identifier of the requested data. This data is transported via the AXI bus 624 to the PLM 638.

The PLM 638 refers to the cache and memory controller 642 to inquire about the location of the data. The memory cache and memory controller 642 will recover the data if it has located it in the cache memories. Otherwise, the PLM 638 refers to the memory interfaces 644 which will look for the data in the external DDR memory 640.

The data is transported to the crossbar 620 via the AXI bus 624. The AXI bus 624 routes the data to the correct destination.

After receiving the data, the hardware module 606 will perform its calculations if the memory component's memory is empty 609.

In embodiments of the present disclosure as disclosed herein, if during the communication between the software module and the hardware module, the hardware reconfigurable region has been loaded by another hardware module, the communication interface reacts, wherein the new module loaded by the CPU waits for the memory component dedicated to it to be empty before beginning its calculations. Backup of data is calculated by the software module in the cache or the external DDR memory. Complete unloading of the memory component dedicated to the hardware reconfigurable region to the external DDR memory before the new hardware module begins these calculations. Configuration of the data header of the new hardware module. Configuration of the communication interface of the new hardware module to start a new communication. The new hardware module begins its new calculations.

Figure 7:
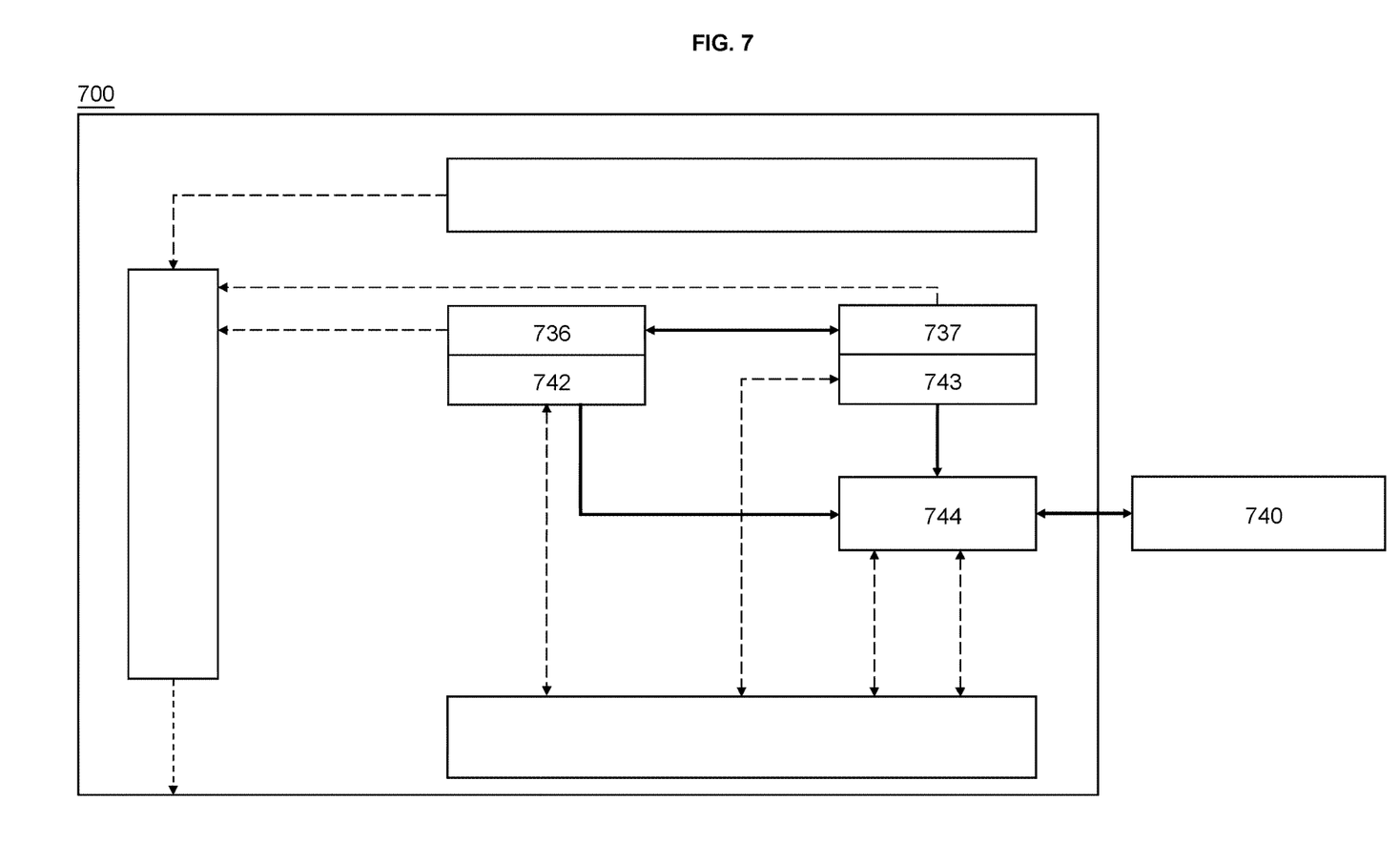
FIG. 7 shows the communication between two software modules according to an embodiment of the present disclosure.

FIG. 7 shows the communication between two software modules according to an embodiment of the present disclosure.

The structure 700 is part of the software part of the overall architecture. The software part comprises a first software module 736, a second software module 737, cache and controller memory 742 and 743, memory interfaces 744, and external DDR memory 740. The structure 700 comprises a method of exchanging data between two software modules.

The first software module 736 requires data that is calculated by the second software module 737.

The first software module 736 communicates directly to the second software module 737 by sending the address of the data it needs. If the second software module's 737 cache and controller memory 743 contains the requested information, it sends it to the first software module 736. Otherwise, there is a cache defect.

In the event of a cache miss, the cache and controller memory 743 continues to access the external DDR memory 740 which sends information stored in the box back to the first software module 736. The line containing the address is stored in the cache for future access.

If the cache and controller memory 742 of the first software module 736 is busy while the second software module's 737 data is being transmitted in, the processor applies a data replacement technique (FIFO, LIFO, or random).

In embodiments of the present disclosure, the implementation approach involves a dynamic deployment of tasks depending on the execution context of the system. This approach uses for this the division into software tasks running on the processor part, and into hardware tasks integrated in the form of IP blocks on the FPGA. The same functionality can then be defined in both integration domains (i.e., as a software task and a hardware task). The present disclosure aims to relieve the designer of the modules of an application of the following task: if a module is intended to communicate with a software module, this module will have a certain interface; if this same module is intended to communicate with a hardware module, then it would have to have another interface. It would, therefore, be necessary to have two application versions (compiled) depending on whether the following module is software or hardware. If this module has interfaces, no longer with 1, but with N other modules that can each be software or hardware, the combination of compiled modules to be designed would be 2 to the power of N ($2^n$). The present disclosure allows the designer to create only one module (executable and therefore compiled).

In embodiments of the present disclosure, an application vendor may want to create an application with an FPGA module, and for performance, cost, space, or other reasons, the same application with the same module can be implemented (created) in software. For example, if an application is made of three interconnected modules (A, B, and C). Wherein, A and C are in software and B is either in software or in hardware. The supplier would have to develop the interfaces twice (once for software, once for hardware). In addition, there would be two final products: one made of three modules including a hardware module and the other made of three software modules (so six modules in all). The present disclosure aims to standardise these interfaces and make transparent the fact that a module is of the software or hardware type. As a further example, there are three tasks (A, B, and C): modules A and C are developed in software and module B is developed in two types-software and hardware. This makes four modules in total. In addition, in operation, to be able to switch from a homogenous configuration (all software) to a heterogenous configuration (software/hardware), there are only four modules that need to be implemented on the physical medium (electronic board).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. An on-chip communication architecture for facilitating the dynamic distribution of tasks within a heterogenous system between Field Programmable Gate Arrays (FPGA) and CPU platforms based on the utilization of these platforms at the time of task assignment, the on-chip communication architecture comprising:
   a hardware component comprising a hardware manager, a communication interface, a reconfigurable region, and a plurality of hardware modules, and
   a software component comprising a software manager and a plurality of software modules,
   wherein, the hardware manager is configured to receive a control signal from the software manager, such that the tasks are allocated to either the hardware component or the software component at least as a function of the control signal; and
   wherein the software manager receives a user-defined parameter from a user in soft-real time.

2. The on-chip communication architecture as claimed in claim 1, wherein the software manager is configured to receive the user-defined parameter from the user and output a software manager control signal at least as a function of the user-defined parameter.

3. The on-chip communication architecture as claimed in claim 2, wherein the control signal is the software manager control signal.

4. The on-chip communication architecture as claimed in claim 1, wherein the user-defined parameter comprises an upper band on resource utilisation of the hardware modules or the software modules.

5. The on-chip communication architecture as claimed in claim 1, wherein the architecture comprises a first interconnect connecting the software component with the hardware component, whereby the first interconnect receives a software manager control signal from the software manager and outputs the control signal at least as a function of the software manager control signal.

6. The on-chip communication architecture as claimed in claim 1, wherein the architecture comprises a second interconnect connecting the software component with the hardware component such that data can inter-flow between the communication interface and the software component.

7. The on-chip communication architecture as claimed in claim 1, wherein the reconfigurable region comprises the plurality hardware modules, each hardware module being configured to perform at least one of the tasks.

8. The on-chip communication architecture as claimed in claim 7, wherein the reconfigurable region comprises memory components connected to the plurality of hardware modules.

9. The on-chip communication architecture as claimed in claim 8, wherein the memory components comprise the shared memory system comprising Block Random Access Memory (BRAM).

10. The on-chip communication architecture as claimed in claim 7, wherein the communication interface comprises a plurality of transmission components and a plurality of receiving components.

11. A method of facilitating the dynamic distribution of tasks within a heterogeneous system between Field Programmable Gate Arrays (FPGA) and CPU platforms based on the utilization of these platforms at the time of task assignment, using an on-chip communication architecture, the architecture comprising a hardware component comprising a hardware manager, and a software component comprising a software manager, the method comprising the steps of:

outputting a software manager control signal from the software manager;

receiving a control signal to the hardware manager, the control signal being at least a function of the software manager control signal; and allocating tasks to either the hardware component or the software component at least as a function of the control signal;

wherein the software manager receives a user-defined parameter from a user in soft-real time.

12. The method as claimed in claim 11, wherein the method comprises receiving the user-defined parameter by the software manager and wherein the step of outputting comprises outputting a software manager control signal at least as a function of the user-defined parameter.

13. The method as claimed in claim 12, wherein the hardware component comprises hardware modules and a software component comprises software modules, and wherein the user-defined parameter comprises an upper bound on resource utilisation of the hardware modules or the software modules.

14. The method as claimed in claim 11, wherein the method comprises the steps of:

receiving the software manager control signal at a first interconnect; and outputting the control signal from the first interconnect.

15. The method as claimed in claim 14, wherein the method comprises the first interconnect receiving a request from a software module, and wherein the control signal is a function of the software manager control signal and the request.

16. The method as claimed in claim 11, wherein the hardware component comprises a reconfigurable region, the method comprising performing calculation by hardware modules within the reconfigurable region to determine the distribution of tasks.

17. The method as claimed in claim 16, wherein the tasks are hybrid tasks.

18. The method as claimed in claim 16, wherein the architecture comprises a communication interface, the method comprising distributing tasks to the software manager via a second interconnect, wherein the distributing is performed by the communication interface.

* * * * *